(12) United States Patent
Yoo et al.

(10) Patent No.: US 12,040,510 B2
(45) Date of Patent: Jul. 16, 2024

(54) BATTERY MODULE SYSTEM COMPRISING EXTERNAL SHORT-CIRCUIT DEVICE AND COOLING DEVICE

(71) Applicant: LG ENERGY SOLUTION, LTD., Seoul (KR)

(72) Inventors: Jae-Min Yoo, Daejeon (KR); Jeong-O Mun, Daejeon (KR); Eun-Gyu Shin, Daejeon (KR); Yoon-Koo Lee, Daejeon (KR); Yong-Seok Choi, Daejeon (KR); Jee-Soon Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/625,469

(22) PCT Filed: Jul. 6, 2020

(86) PCT No.: PCT/KR2020/008812
§ 371 (c)(1),
(2) Date: Jan. 7, 2022

(87) PCT Pub. No.: WO2021/006586
PCT Pub. Date: Jan. 14, 2021

(65) Prior Publication Data
US 2022/0285802 A1 Sep. 8, 2022

(30) Foreign Application Priority Data
Jul. 8, 2019 (KR) .................. 10-2019-0082289

(51) Int. Cl.
*H01M 50/581* (2021.01)
*H01M 10/42* (2006.01)
(Continued)

(52) U.S. Cl.
CPC ....... *H01M 50/581* (2021.01); *H01M 10/425* (2013.01); *H01M 10/486* (2013.01);
(Continued)

(58) Field of Classification Search
None
See application file for complete search history.

(56) References Cited

U.S. PATENT DOCUMENTS

2003/0017383 A1 1/2003 Ura et al.
2007/0018780 A1 1/2007 Furukawa et al.
(Continued)

FOREIGN PATENT DOCUMENTS

CN 210956915 * 7/2020
JP 1994-029433 A 2/1994
(Continued)

OTHER PUBLICATIONS

International Search Report (PCT/ISA/210) issued in PCT/KR2020/008812, dated Oct. 26, 2020.
(Continued)

*Primary Examiner* — Lisa S Park
(74) *Attorney, Agent, or Firm* — Birch, Stewart, Kolasch & Birch, LLP (57) ABSTRACT

A battery module system includes a cooling device, a battery module disposed on the cooling device, the battery module being in direct or indirect contact with the cooling device, a sensor attached to the battery module to sense a temperature of the battery module or gas generated from the battery module, a battery management system to output a switching on/off signal with reference to a sensing signal transmitted from the sensor; and an external short-circuiting device connected between the positive electrode and negative electrode of the battery module to induce an external short circuit of the battery module, the external short-circuiting
(Continued)

device including: a resistor disposed on the cooling device, the resistor being in direct or indirect contact with the cooling device; and a switch to electrically connect or isolate the battery module to/from the resistor according to the switching on/off signal.

12 Claims, 5 Drawing Sheets

(51) Int. Cl.
*H01M 10/48* (2006.01)
*H01M 10/613* (2014.01)
*H01M 10/63* (2014.01)
*H01M 10/6568* (2014.01)
*H01M 50/502* (2021.01)

(52) U.S. Cl.
CPC ......... *H01M 10/613* (2015.04); *H01M 10/63* (2015.04); *H01M 10/6568* (2015.04); *H01M 50/502* (2021.01); *H01M 2220/20* (2013.01)

(56) References Cited

U.S. PATENT DOCUMENTS

| | | | |
|---|---|---|---|
| 2010/0026242 A1 | 2/2010 | Forslöw | |
| 2014/0099521 A1* | 4/2014 | Kim | B60L 58/27 |
| | | | 429/50 |
| 2014/0242436 A1* | 8/2014 | Pyzza | H05K 7/02 |
| | | | 361/752 |
| 2018/0019508 A1* | 1/2018 | Lee | H01M 10/625 |
| 2018/0316207 A1 | 11/2018 | Irish et al. | |
| 2020/0067040 A1* | 2/2020 | Kim | H01M 10/482 |
| 2020/0220128 A1 | 7/2020 | Kim et al. | |
| 2021/0296721 A1* | 9/2021 | Omura | H01M 10/6556 |

FOREIGN PATENT DOCUMENTS

| | | | |
|---|---|---|---|
| JP | 2002-141112 A | | 5/2002 |
| JP | 3864538 B2 | | 1/2007 |
| JP | 2010-064651 A | | 3/2010 |
| JP | 2010-515406 A | | 5/2010 |
| JP | 2011-120423 | * | 6/2011 |
| JP | 2011-120423 A | | 6/2011 |
| JP | 2012-236493 A | | 12/2012 |
| JP | 2013-069959 A | | 4/2013 |
| JP | 2017-069371 A | | 4/2017 |
| JP | 2018-157201 A | | 10/2018 |
| JP | 2018-538664 A | | 12/2018 |
| KR | 10-2006-0027579 A | | 3/2006 |
| KR | 10-2013-0121255 A | | 11/2013 |
| KR | 10-2016-0006000 A | | 1/2016 |
| KR | 10-1795446 B1 | | 11/2017 |
| KR | 10-2018-0066608 A | | 6/2018 |
| KR | 10-2018-0103081 A | | 9/2018 |
| KR | 10-2019-0064835 A | | 6/2019 |
| KR | 10-2019-0069872 A | | 6/2019 |
| WO | WO 2019/107795 A1 | | 6/2019 |

OTHER PUBLICATIONS

Extended Search Report issued in Application No. 20837840.6, dated Sep. 14, 2022.

* cited by examiner

FIG. 5

BATTERY MODULE SYSTEM COMPRISING EXTERNAL SHORT-CIRCUIT DEVICE AND COOLING DEVICE

TECHNICAL FIELD

The present disclosure relates to a battery module system with an external short-circuiting device and a cooling device, and more particularly, to a battery module system including an external short-circuiting device to release energy inside a battery module to the outside to prevent overheating and/or a fire occurred in a battery cell of the battery module from spreading to adjacent battery cells, and a cooling device to cool down a resistor of the external short-circuiting device.

The present application claims the benefit of Korean Patent Application No. 10-2019-0082289 filed on Jul. 8, 2019 with the Korean Intellectual Property Office, the disclosure of which is incorporated herein by reference in its entirety.

BACKGROUND ART

In a battery module including a plurality of battery cells, when a failure such as a short circuit occurs in a battery cell and the temperature of the battery cell exceeds the critical temperature, thermal runaway occurs. When thermal runaway occurs, the safety issue may arise.

When thermal runaway occurred in the battery cell results in flames, the temperature of adjacent battery cells rapidly increases, leading to thermal runaway propagation in a short time.

When it fails to quickly cope with the thermal runaway occurred in the battery cell or the potential for thermal runaway, a catastrophe such as fire and explosion may occur to the battery module or a battery pack having larger capacity than the battery cell, causing economic damage and safety problem.

Accordingly, when thermal runaway or a temperature rise and/or gas leaks leading to thermal runaway occur in the battery cell within the battery module, it is urgently necessary to quickly detect the abnormal condition and release energy of the battery module to the outside to prevent the thermal runaway from spreading to adjacent battery modules.

DISCLOSURE

Technical Problem

The present disclosure is designed to solve the above-described problem, and therefore the present disclosure is aimed at quickly detecting thermal runaway occurred in a battery cell within a battery module or a temperature rise and/or gas leaks leading to thermal runaway, and releasing energy inside the battery module to the outside through an external short-circuiting device.

In addition, the present disclosure is aimed at quickly cooling down a resistor having the increased temperature through the released energy to remove a secondary risk that a fire may occur due to the energy release through the external short-circuiting device.

The technical problem to be solved is not limited to the above-described problem, and other problems not mentioned herein will be clearly understood by those skilled in the art from the following description.

Technical Solution

To solve the above-described problem, a battery module system according to an embodiment of the present disclosure includes a cooling device, a battery module disposed on the cooling device, the battery module being in direct or indirect contact with the cooling device, a sensor attached to the battery module to sense a temperature of the battery module or gas generated from the battery module, a battery management system (BMS) configured to output a switching on/off signal with reference to a sensing signal transmitted from the sensor, and an external short-circuiting device connected between a positive electrode and a negative electrode of the battery module to induce an external short circuit of the battery module, the external short-circuiting device including: a resistor disposed on the cooling device, the resistor being in direct or indirect contact with the cooling device; and a switch to electrically connect the battery module to the resistor or electrically isolate the battery module from the resistor according to the switching on/off signal.

The battery module may include a cell stack formed by stacking a plurality of battery cells.

The battery module may include a pair of busbar frames coupled to a first side and a second side of the cell stack respectively.

The pair of busbar frames may be sliding-coupled to the cooling device.

The cooling device may have a receiving groove formed to a predetermined depth on one side, and the receiving groove may be filled with a thermally conductive plastic.

The resistor may be disposed on the thermally conductive plastic, and may be in direct or indirect contact with the thermally conductive plastic.

The cooling device may include a plurality of heat radiation fins protruding from a bottom of the receiving groove to maximize a contact area between the cooling device and the thermally conductive plastic.

The cooling device may include a module cooling device and a resistor cooling device connected to the module cooling device, the battery module may be disposed on the module cooling device, and the resistor may be disposed on the resistor cooling device.

The battery module system may further include a valve installed between the module cooling device and the resistor cooling device to allow or block a flow of a cooling fluid between the module cooling device and the resistor cooling device.

The BMS may output a valve opening/closing signal with reference to the sensing signal transmitted from the sensor.

An energy storage system according to an embodiment of the present disclosure includes the battery module system.

A vehicle according to an embodiment of the present disclosure includes the battery module system.

Advantageous Effects

According to an aspect of the present disclosure, it is possible to quickly detect thermal runaway occurred in a battery cell within a battery module or a temperature rise and/or gas leaks leading to thermal runaway, and release energy inside the battery module to the outside through an external short-circuiting device, thereby ensuring safety of a secondary battery while in use.

In addition, according to another aspect of the present disclosure, it is possible to quickly cool down a resistor having the increased temperature through the released energy to remove a secondary risk that a fire may occur due to the energy release through the external short-circuiting device.

BRIEF DESCRIPTION OF THE DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

DETAILED DESCRIPTION

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation. Therefore, the embodiments described herein and illustrations shown in the drawings are just some preferred embodiment of the present disclosure, but not intended to fully describe the technical aspects of the present disclosure, so it should be understood that a variety of other equivalents and modifications could have been made thereto at the time that the application was filed.

Figure 1:
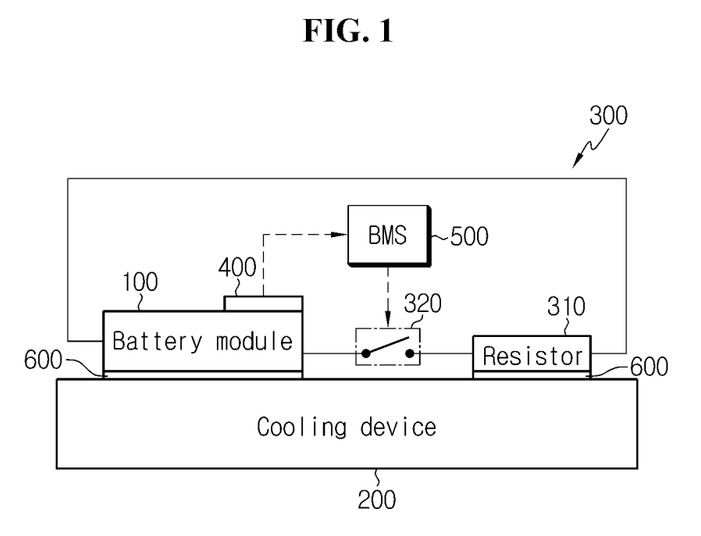
FIG. 1 is a conceptual diagram showing a battery module system according to an embodiment of the present disclosure.

Referring to FIG. 1, a battery module system according to an embodiment of the present disclosure includes a battery module 100, a cooling device 200, an external short-circuiting device 300, a sensor 400, and a battery management system (BMS) 500.

Figure 2:
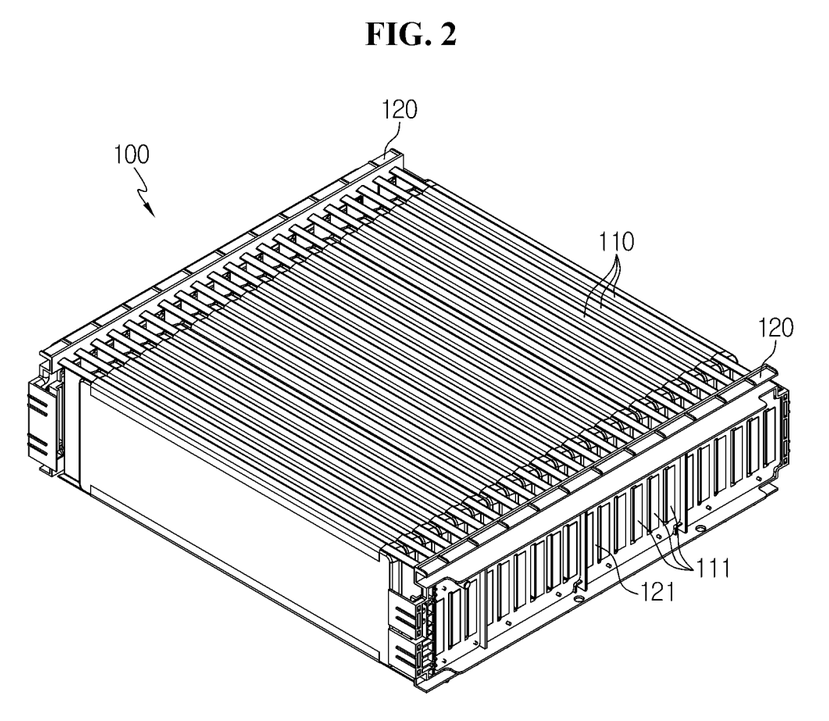
FIG. 2 is a perspective view showing a battery module applied to a battery module system according to an embodiment of the present disclosure.

Referring to FIGS. 1 and 2, the battery module 100 is disposed on the cooling device 200, and includes a cell stack formed by stacking a plurality of battery cells 110 and a bus bar frame 120 coupled to each of two sides of the cell stack.

The battery module 100 is in direct or indirect contact with the cooling device 200, and heat generated from the battery module 100 is released to the outside through the cooling device 200. A sheet-type thermal interface material (TIM) 600 may be interposed between the battery module 100 and the cooling device 200 to increase the contact area between the two components.

The battery cell 110 may include, for example, a pouch type battery cell. The battery cell 110 has a pair of electrode leads 111 respectively extending through two sides in the length direction.

A pair of bus bar frames 120 are provided, and the pair of bus bar frames 120 are respectively coupled to one side and the other side on which the electrode leads 111 of the cell stack are disposed. The bus bar frame 120 includes a plurality of bus bars 121. The electrode leads 111 of the battery cells 110 extend through slits formed in the bus bars 121, and are bent and fixed onto the bus bars 121 by welding. The plurality of electrode leads 111 is in contact with/fixed onto one bus bar 121 to electrically connect the plurality of adjacent battery cells 110 to each other.

Referring to FIG. 1, the cooling device 200 is configured to cool down the battery module 100 and the resistor 310 of the external short-circuiting device 300. The cooling device 200 may include a heat sink having cooling channels through which a cooling fluid such as cooling water flows.

The external short-circuiting device 300 is connected between positive electrode and negative electrode of the battery module 100 to induce an external short circuit of the battery module 100 under a specific condition for fast power consumption of the battery module 100. That is, the external short-circuiting device 300 forms an external short circuit with the battery module 100.

To realize this function, the external short-circuiting device 300 includes a resistor 310 and a switch 320. The resistor 310 is disposed on the cooling device 200 and is in direct or indirect contact with the cooling device 200. The switch 320 is electrically connected to or electrically isolated from the battery module 100 according to a signal outputted from the BMS 500. The resistor 310 may be, for example, a shunt resistor.

When the switch 320 is switched on to electrically connect the battery module 100 to the resistor 310, the power of the battery module 100 is consumed through the resistor 310 and accordingly the temperature of the resistor 310 rises. In this case, the cooling device 200 in direct or indirect contact with the resistor 310 removes heat from the resistor 310 and releases the heat to the outside. The sheet-type TIM 600 may be interposed between the resistor 310 and the cooling device 200 to increase the contact area between the two components.

The sensor 400 is attached to the battery module 100 to sense the temperature of the battery module 100 or gas generated from the battery module. That is, the sensor 400 is a temperature sensor or a gas leak detection sensor. When the sensor 400 is a temperature sensor, a plurality of sensors 400 may be provided, and the plurality of sensors 400 may be attached to each battery cell 110 of the battery module 100. The temperature sensor may be installed at the top or bottom edge (sealing part) of the battery cell 110. Alternatively, the temperature sensor may be installed at a terrace portion in which an electrode terminal of the cell is disposed or a receiving portion in which an electrode assembly is received. Alternatively, the temperature sensor may be installed on the busbar electrically connected to the electrode terminal of the battery cell 110.

In addition, when the sensor 400 is a gas leak detection sensor, a plurality of sensors 400 may be provided to quickly and accurately detect gas leaks, and the plurality of sensors 400 may be attached to different locations.

The temperature sensor may have multiple temperature measurement points in one body. For example, the body of the temperature sensor may extend along the stack direction of the plurality of battery cells of the cell stack. The temperature measurement points of the temperature sensor may be configured to contact the top edge (sealing part) of the plurality of battery cells.

When the temperature rises above the reference temperature (60° C.: warning, 150° C.: temperature at which safety function operates) at the temperature measurement point, the temperature sensor is configured to transmit (detect) a signal indicating a resistance change.

According to this configuration of the present disclosure, when the temperature sensor having multiple temperature measurement points in one body is used, it is possible to detect a failure occurred in even a single battery cell of the cell stack, thereby increasing the stability of the module system. Moreover, since there is no need to have a plurality of temperature sensors for multiple temperature measurement points, it is possible to reduce the manufacturing cost of the battery module system and simplify the signal transmission network of the system.

Preferably, the sensor 400 includes both a gas sensor and a temperature sensor to reduce the error probability.

The BMS 500 outputs a switching on/off signal with reference to the sensing signal transmitted from the sensor 400. In addition, the BMS 500 may be connected to the battery module 100 to control the charge and discharge of the battery module 100.

Specifically, when a temperature rise above the reference temperature or gas leaks are detected in the battery module 100, the BMS 500 outputs a switching-on signal to allow the current to flow on the external short circuit connected between the positive electrode and negative electrode of the battery module 100, causing power consumption of the battery module 100. When the power of the battery module 100 is consumed, the energy of the battery module 100 decreases, thereby preventing the overheating or fire/explosion issue of a certain battery cell 110 from spreading to adjacent battery cells 110.

After the switching-on signal is outputted due to the temperature rise or gas leaks in the battery module 100, when the temperature of the battery module 100 is lower than the safety temperature or gas leaks are not detected for a predetermined time or longer, the BMS 500 outputs a switching-off signal to block the flow of current through the external short circuit.

Figure 3:
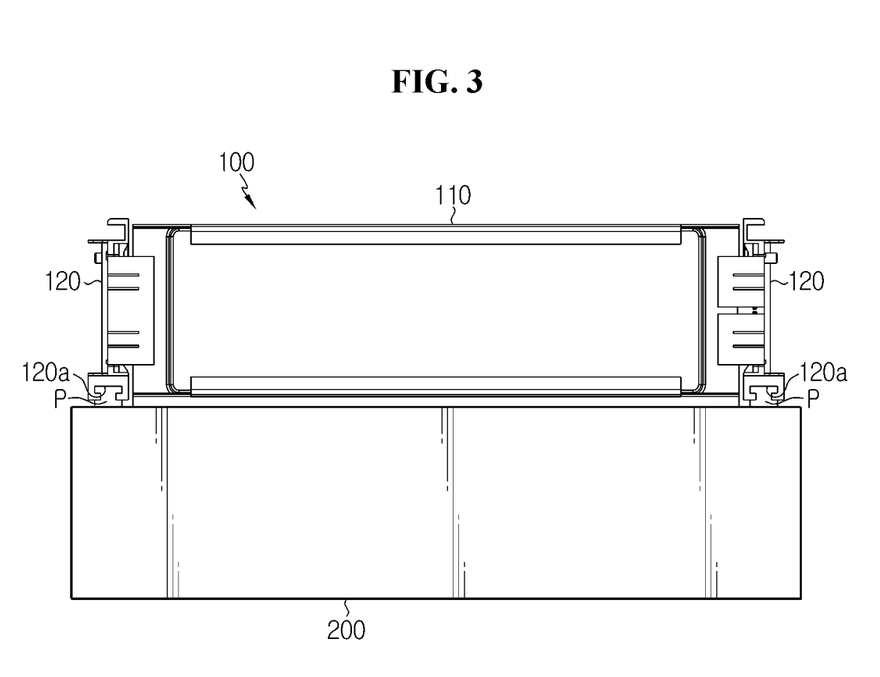
FIG. 3 is a diagram showing a connection relationship between a battery module and a cooling device applied to a battery module system according to an embodiment of the present disclosure.

Referring to FIG. 3, as opposed to FIG. 1, the battery module 100 may be fastened to the cooling device 200 by sliding coupling. In this case, the busbar frame 120 may have a fastening groove 120a, and the cooling device 200 may have a fastening protrusion P having a shape and a position corresponding to the fastening groove 120a. That is, the battery module 100 may be slidably coupled to the cooling device 200 through the fastening groove 120a and the fastening protrusion P. Here, the sliding coupling indicates that the battery module is slidably moveable in two directions while being coupled onto the cooling device 200.

In case that the battery module 100 and the cooling device 200 are configured such that they are fastened to each other by sliding coupling therebetween, the battery module 100 and the cooling device 200 may be fastened to each other when the sheet-type TIM 600 interposed between the cell stack of the battery module 100 and the cooling device 200 is compressed by the cell stack. When the battery module 100 and the cooling device 200 are fastened to each other with the TIM 600 in compressed state, firm coupling between the battery module 100 and the cooling device 200 may be accomplished, and the contact area between the cell stack and the cooling device 200 may increase, thereby maximizing the cooling efficiency of the battery module 100.

Figure 4:
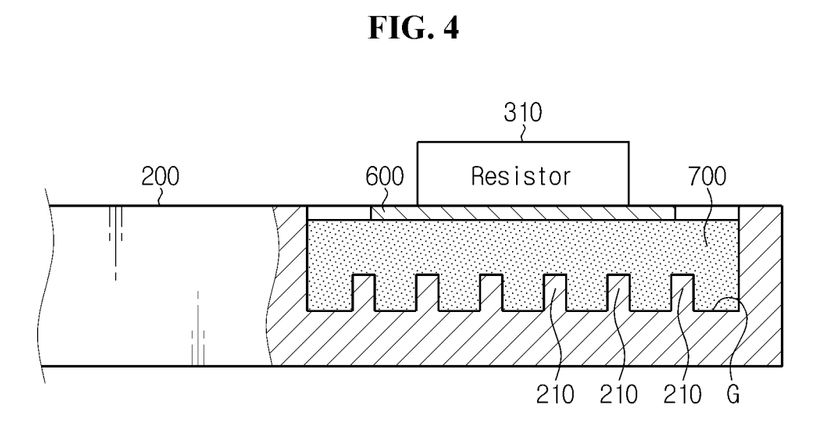
FIG. 4 is a diagram showing a connection structure of a cooling device and a resistor according to an embodiment of the present disclosure.

Referring to FIG. 4, as opposed to FIG. 1, the cooling device 200 may have a receiving groove G formed to a predetermined depth on one side, and the receiving groove G may be filled with a thermally conductive plastic 700. In this case, the resistor 310 is disposed on the thermally conductive plastic 700 and is in direct or indirect contact with the thermally conductive plastic 700. That is, the resistor 310 may be directly attached to the thermally conductive plastic 700 filled in the receiving groove G. Alternatively, the TIM 600 may be interposed between the resistor 310 and the thermally conductive plastic 700.

In addition, the cooling device 200 may include a plurality of heat radiation fins 210 protruding upward from the bottom of the receiving groove G to maximize the contact area between the cooling device 200 and the thermally conductive plastic 700.

Hereinafter, a battery module system according to another embodiment of the present disclosure will be described with reference to FIG. 5.

Compared to the battery module system according to the embodiment of the present disclosure as described above, the battery module system according to another embodiment of the present disclosure includes two cooling devices 200 and further includes a valve 800, and the remaining components are substantially the same. Accordingly, in describing the battery module system according to another embodiment of the present disclosure, the same description as the previous embodiment is omitted herein, and a detailed description of the cooling devices 200A and 200B and the valve 800 will be provided.

Figure 5:
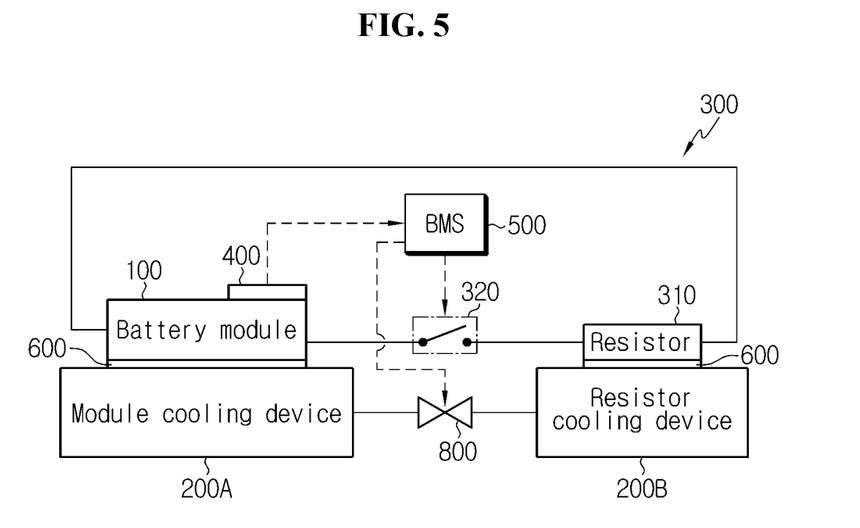
FIG. 5 is a conceptual diagram showing a battery module system according to another embodiment of the present disclosure.

Referring to FIG. 5, the cooling device 200 includes a module cooling device 200A and a resistor cooling device 200B connected to the module cooling device 200A. The battery module 100 is disposed on the module cooling device 200A, and the resistor 310 is disposed on the resistor cooling device 200B.

In the same way as the previous embodiment, the battery module 100 and the module cooling device 200A may be in direct or indirect contact with each other with the TIM 600 interposed therebetween. In addition, the battery module 100 and the module cooling device 200A may be fastened by sliding coupling in the same way as the previous embodiment (see FIG. 3).

Likewise, the resistor 310 and the resistor cooling device 200B may be in direct or indirect contact with the TIM 600 interposed therebetween in the same way as the previous embodiment. In addition, the resistor cooling device 200B may have a receiving groove G on one side, the receiving groove G may be filled with a heat conductive plastic 700, and the heat radiation fins 210 may protrude from the bottom of the receiving groove G in the same way as the previous embodiment (see FIG. 4).

The valve 800 is installed between the module cooling device 200A and the resistor cooling device 200B to allow or block the flow of the cooling fluid between the module cooling device 200A and the resistor cooling device 200B. The valve 800 operates according to a valve opening/closing signal outputted from the BMS 500.

Specifically, when an increase in the temperature of the battery module 100 above the reference temperature or gas leaks are detected by the sensor 400, the BMS 500 outputs a valve opening signal to allow the cooling fluid flowing in the module cooling device 200A to flow through the resistor cooling device 200B. In addition, after the output of the valve opening signal, when the temperature of the battery module 100 detected by the sensor 400 is lower than the safety temperature or gas leaks are not detected for a predetermined time or longer, the BMS 500 outputs a valve closing signal to block the flow of the fluid between the module cooling device 200A and the resistor cooling device 200B.

As described above, when overheating or gas leaks are detected in the battery cell 110 of the battery module 100, the battery module system according to the present disclosure is configured to lower the energy level of the battery module 100 through the external short-circuiting device 300, thereby ensuring safety of the secondary battery in use. In addition, the battery module system according to the present disclosure has a structure for quickly cooling the resistor 310 having the increased temperature when lowering the energy level of the battery module 100 through the external short-circuiting device 300.

In addition, an energy storage system according to the present disclosure may include the battery module system. Moreover, the energy storage system (not shown) may include a rack case (not shown) in which the battery module system is received. Furthermore, a vehicle (not shown) according to the present disclosure may include the battery module system. Further, the vehicle may be, for example, an electric vehicle including an electric motor (not shown) that is supplied with power from the battery module system.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

What is claimed is:

1. A battery module system comprising:
    a cooling plate;
    a battery module disposed on a first surface of the cooling plate, the battery module being in direct or indirect contact with the cooling plate;
    a sensor attached to the battery module to sense a temperature of the battery module or gas generated from the battery module;
    a battery management system (BMS) configured to output a switching on/off signal with reference to a sensing signal transmitted from the sensor;
    an external short-circuiting device spaced from the battery module and connected to a positive electrode and a negative electrode of the battery module to induce an external short circuit of the battery module, the external short-circuiting device including:
    a resistor disposed on the first surface of the cooling plate, the resistor in direct or indirect contact with the cooling plate; and
    a switch to electrically connect the battery module to the resistor or electrically isolate the battery module from the resistor according to the switching on/off signal;
    a receiving groove formed to a predetermined depth on one side of the cooling plate;
    a plurality of fins and grooves formed in a bottom surface of the receiving groove; and
    a thermally conductive plastic in the receiving groove, the fins extending into the thermally conductive plastic,
    wherein the receiving groove and thermally conductive plastic cover a first portion of the cooling plate, and
    wherein the resistor is on the first portion and the battery module is spaced from the first portion.

2. The battery module system according to claim 1, wherein the battery module includes a cell stack formed by stacking a plurality of battery cells.

3. The battery module system according to claim 2, wherein the battery module includes a pair of busbar frames coupled to a first side and a second side of the cell stack, respectively.

4. The battery module system according to claim 3, wherein the pair of busbar frames are slidingly coupled to the cooling plate.

5. The battery module system according to claim 1, wherein the cooling plate includes a module cooling plate and a resistor cooling plate connected to the module cooling plate, and
    wherein the battery module is disposed on the module cooling plate, and the resistor is disposed on the resistor cooling plate.

6. The battery module system according to claim 5, further comprising a valve installed between the module cooling plate and the resistor cooling plate to allow or block a flow of a cooling fluid between the module cooling plate and the resistor cooling plate.

7. The battery module system according to claim 6, wherein the BMS outputs a valve opening/closing signal with reference to the sensing signal transmitted from the sensor.

8. An energy storage system comprising the battery module system according to claim 1.

9. A vehicle comprising the battery module system according to claim 1.

10. The battery module system according to claim 1, wherein a length of the cooling plate in a first direction is greater than a length of the battery module in the first direction, and
    wherein the external short-circuiting device is spaced from the battery module in the first direction.

11. The battery module system according to claim 1, wherein the battery module has a housing, and
    wherein the external short-circuiting device does not contact the housing of the battery module.

12. The battery module system according to claim 1, further comprising a thermal interface material in the receiving groove and between the resistor and the thermally conductive plastic.

* * * * *